United States Patent [19]

Hirai et al.

[11] Patent Number: 4,696,682

[45] Date of Patent: Sep. 29, 1987

[54] SOLID ADSORBENT FOR CARBON MONOXIDE AND PROCESS FOR SEPARATION FROM GAS MIXTURE

[75] Inventors: Hidefumi Hirai; Makoto Komiyama; Susumu Hara, all of Tokyo; Keiichiro Wada, Kiyose, all of Japan

[73] Assignee: Nippon Steel Corporation, Tokyo, Japan

[21] Appl. No.: 587,674

[22] Filed: Mar. 8, 1984

Related U.S. Application Data

[62] Division of Ser. No. 411,000, Aug. 24, 1982, Pat. No. 4,470,829.

[30] Foreign Application Priority Data

| Aug. 31, 1981 | [JP] | Japan | 56-136526 |
| Dec. 16, 1981 | [JP] | Japan | 56-203053 |
| Jan. 22, 1982 | [JP] | Japan | 57-008303 |

[51] Int. Cl.$^4$ .................................................. B01D 53/04
[52] U.S. Cl. ........................................ 55/68; 55/58; 55/74; 55/387
[58] Field of Search ............... 55/58, 68, 74, 387; 423/239 A, 246, 247, 415 A; 502/181–184

[56] References Cited

U.S. PATENT DOCUMENTS

| 3,317,452 | 5/1967 | Louis et al. | 55/74 X |
| 3,658,463 | 4/1972 | Billings | 55/68 X |
| 4,019,879 | 4/1977 | Rabo et al. | 55/68 |
| 4,102,802 | 7/1978 | Johnson et al. | 55/68 X |
| 4,110,252 | 8/1978 | Smith et al. | 502/181 |
| 4,116,996 | 9/1978 | Huang | 502/184 X |
| 4,158,643 | 6/1979 | Sinha | 502/182 X |
| 4,174,373 | 11/1979 | Yoshida et al. | 423/239 A |
| 4,242,226 | 12/1980 | Siren | 55/74 X |
| 4,279,874 | 7/1981 | Doyle | 55/68 X |

FOREIGN PATENT DOCUMENTS 1318790 5/1973 United Kingdom .

*Primary Examiner*—Robert Spitzer
*Attorney, Agent, or Firm*—Cushman, Darby & Cushman

[57] ABSTRACT

A solid adsorbent comprising:
(a) at least one copper(I) halide, (b) at least one aluminum(III) halide, and (c) polystyrene or its derivatives; or
(a) at least one copper(I) halide, (b) at least one aluminum(III) halide, and (c') activated carbon or graphite.

This solid adsorbent can effectively adsorb carbon monoxide from a gas mixture containing 1% to 99% by volume of carbon monoxide. Furthermore, the adsorbents comprising components (a), (b) and (c'), or components (a), (b) and (c) prepared by using nonaromatic solvents can effectively adsorb carbon monoxide from a gas mixture containing up to approximately 40,000 ppm of water.

6 Claims, No Drawings

SOLID ADSORBENT FOR CARBON MONOXIDE AND PROCESS FOR SEPARATION FROM GAS MIXTURE

CROSS REFERENCE TO RELATED APPLICATIONS

This application is a division of our earlier application Ser. No. 411,000 filed Aug. 24, 1982, now U.S. Pat. No. 4,470,829.

The present invention relates to a solid adsorbent for carbon monoxide. The present invention also relates to a process for removing carbon monoxide from a gas mixture containing carbon monoxide together with nitrogen, oxygen, methane, carbon dioxide, and hydrogen.

Carbon monoxide is a basic or fundamental raw material. Carbon monoxide is generally produced from coke and coal by using, for example, a gas generator, a water gas generator, a Winkler oven, a Lurgi gasifier or a Koppers oven. Carbon monoxide is further produced from a natural gas or petroleum hydrocarbon by a so-called steam reforming process or a so-called partial oxidation process. The product gases obtained from these processes contain other than carbon monoxide, hydrogen, carbon dioxide, methane, and nitrogen, as well as a small amount of water. For example, a water gas generally contains 35% through 40% carbon monoxide, 0.5% through 1.0% methane, 4% through 9% nitrogen and 1000 through 20000 ppm of water. Furthermore, carbon monoxide is obtained, as a by-product, from steel plants, oil refineries, or petrochemical plants. The carbon monoxide must be separated from these gas mixtures in order to be used as a chemical synthesis raw material.

On the other hand, hydrogen is also an important raw material and is separated from the above-mentioned various gas mixture or waste gases from a petrochemical plant, such as those derived from the dehydrogenation step of hydrocarbons. The hydrogen thus obtained generally contains a small amount of carbon monoxide. This carbon monoxide must be separated and removed from hydrogen gas, since carbon monoxide poisons catalysts for reactions using hydrogen. Furthermore, the above-mentioned waste gases generally contain a small amount of water.

The separation or removal of carbon monoxide from a gas mixture is usually carried out by using a liquid absorbent.

Known processes for separating and removing carbon monoxide from a gas mixture include a so-called copper-liquor scrubbing process in which carbon monoxide is absorbed into an aqueous ammoniacal copper(I) formate solution or a suspension of copper(I) chloride in hydrochloric acid by contacting a gas mixture containing carbon monoxide with the copper solution or suspension at a room temperature under 150 through 200 atm. The absorbed carbon monoxide is then released from the copper solution or suspension by heating the copper solution or suspension under reduced pressure. The copper solution or suspension is thus regenerated and reused. However, this process has disadvantages in that it is difficult to control the operation in order to prevent corrosion of the apparatuses, loss of the copper solution or suspension, and formation of precipitates, and also the construction cost is high due to the use of high-pressure equipment.

British Patent Specification No. 1318790 discloses a process for the recovery of carbon monoxide having a purity of 95% from a gas mixture, in which the gas mixture containing 30 mol% of carbon monoxide is contacted with a toluene solution of aluminum copper(I) chloride $CuAlCl_4$ at a temperature of 25° C. The toluene solution containing the absorbed carbon monoxide releases carbon monoxide upon heating at a temperature of 80° C. Thus, 95% of carbon monoxide is recovered. This process has advantages in that the absorption of carbon monoxide is not affected by hydrogen, carbon dioxide, methane, nitrogen, and oxygen contained in the gas mixture, and carbon monoxide can be absorbed under a low pressure. However, this process still has a disadvantage in that the water content in the gas mixture must be strictly regulated to an amount of 1 ppm or less in an industrial application, since cuprous aluminum tetrachloride irreversibly reacts with water present in the gas mixture and deactivates, as described by D. J. Hasse and D. G. Walker in Chemical Engineering Progess, Vol 70, No. 5, pp 76, May 1974. Accordingly, the gas mixture should be completely dehydrated prior to the absorption step under strict control. Furthermore, cuprous aluminum tetrachloride strongly irreversibly reacts with water and deactivates, unable to absorb carbon monoxide even with presence of 1 ppm of water in the gas mixture. Thus, the deactivated amount of the cuprous aluminum tetrachloride is gradually increased with the increase of treated amount of the gas mixture and corrosion of apparatuses is progressed with the lapse of time due to hydrochloric acid formed in the reaction of cuprous aluminum tetrachloride with water. In addition to the above disadvantage, this process has a further disadvantage in that toluene vapor should be separated from the recovered carbon monoxide in a separate step, since the recovered carbon monoxide released from the toluene solution of cuprous aluminum tetrachloride at a temperature of 80° C. in a recovery system is saturated with the vapor of the toluene solvent. Still furthermore, the process using a liquid absorbent is disadvantageous as compared with the process using a solid absorbent from the viewpoints of various process limitations.

Other various processes for separating carbon monoxide from gas mixtures have been proposed. However, up until now there has been no satisfactory process in the art for separating carbon monoxide from gas mixtures, especially by using solid adsorbents.

Accordingly, the objects of the present invention are to eliminate the above-mentioned disadvantages of the prior arts and to provide a solid adsorbent, which is capable of adsorbing and releasing carbon monoxide under relatively mild conditions.

Another object of the present invention is to provide a water-resistant adsorbent, which is stable against the water contained in the gas mixture.

A further object of the present invention is to provide a process for effectively separating carbon monoxide from a gas mixture in which the removal of the solvent vapor from the recovered carbon monoxide is simplified as compared with the conventional processes.

Other objects and advantages of the present invention will be apparent from the description set forth hereinbelow.

In accordance with the present invention, a solid adsorbent for carbon monoxide is provided comprising (a) at least one copper (I) halide, (b) at least one aluminum(III) halide, and (c) polystyrene or its derivatives.

In accordance with the present invention, a solid adsorbent for carbon monoxide is provided comprising (a) at least one copper(I) halide, (b) at least one aluminum(III) halide, and (c) activated carbon or graphite.

In accordance with the present invention, further provided is a process for separating carbon monoxide from a gas mixture comprising the step of:

Contacting the gas mixture with a solid adsorbent comprising (a) at least one copper(I) halide, (b) at least one aluminum(III) halide, and (c) polystyrene or its derivatives.

In accordance with the present invention, further provided is a process for separating carbon monoxide from a gas mixture comprising the step of:

contacting the gas mixture with a solid adsorbent comprising (a) at least one copper(I) halide, (b) at least one aluminum(III) halide, and (c') activated carbon or graphite.

The copper(I) halides (i.e. the component (a)) usable in the present invention include, for example, copper(I) chloride and copper(I) bromide. These halides can be used alone or in any mixtures thereof.

The aluminum(III) halides (i.e. the component (b)) usable in the present invention include, for example, aluminum(III) chloride, aluminum(III) fluoride and aluminum (III) bromide. These halides can be used alone or in any mixtures thereof.

A molar ratio of the copper(I) halide to the aluminum(III) halide contained in the adsorbent is generally 0.3 through 10, desirably 0.5 through 1.5.

A molar ratio of the copper(I) halide to the aluminum(III) halide of less than 0.3 tends to decrease the adsorption capacity of the adsorbent and also to give rise to an undesirable side reaction by aluminum halide. Contrary to this, a molar ratio of the copper(I) halide to the aluminum(III) halide of more than 10 tends to decrease the separation efficiency of carbon monoxide per unit amount of copper(I) halide used.

The polystyrene or its derivatives (i.e. the component (c)) usable in the present invention include, for example, any conventional polystyrene desirably having a number-average molecular weight of 5000 to 500,000 or styrene copolymers containing, as a comonomer, divinylbenzene, butadiene, or their derivatives. The desirable polystyrene derivatives are copolymers of 60 mol% to 989 mol% of styrene and 1 mol% to 40 mol% of divinylbenzene. These polymers can be used alone or in any mixture thereof.

A molar ratio of the monomer residual group of the polystyrene or its derivatives to the copper(I) halide is 0.5 through 30, desirably 1 through 3. The term "monomer residual group" used herein means a monomer unit incorporated into polymers or copolymers.

A molar ratio of the monomer residual group of the polystyrene or its derivatives to the copper (I) halide of less than 0.5 tends to decrease water-resistance of the adsorbents. Contrary to this, said molar ratio of more than 30 tends to decrease the carbon monoxide adsorption capacity per unit volume of the adsorbents.

The above-mentioned adsorbents comprising the components (a), (b), and (c) can be prepared by, for example, mixing these components together at an ambient temperature, desirably 40° C. to 60° C. for several hours while stirring in a solvent, and then removing the solvent by, for example, reduced distillation. Thus, a solid adsorbent is formed.

The solvent usable in the present invention are, for example, nonaromatic solvents such as carbon disulfide, methylene chloride, chloroform, dichloroethane, tetrachloroethane, tetrachloroethylene, cyclohexane, and decaline. The resultant adsorbent has an advantage in that it is stable against the water contained in the gas mixture. In addition, aromatic solvents such as benzene and toluene may be used in the preparation of the solid adsorbent.

The activated carbon or graphite usable in the present invention includes any conventional activated carbon or graphite desirably having an average particle size of 100 to 10,000 microns and a surface area of 500 to 2000 m2/g.

A weight ratio of the activated carbon or graphite to the copper(I) halide is 0.25 through 25, desirably 2 through 10.

A weight ratio of the activated carbon or graphite to the copper(I) halide of less than 0.25 tends to decrease the water-resistance of the adsorbent. Contrary to this, said molar ratio of more than 25 tends to decrease the carbon monoxide adsorption capacity per unit volume of the adsorbent.

The above-mentioned adsorbents comprising the components (a), (b), and (c') can be prepared by, for example, mixing activated carbon or graphite with a solution of the copper(I) halide and the aluminum(III) halide prepared by dissolving them in a solvent at a temperature of 20° C. to 80° C., usually 40° C. to 60° C., and then by removing the solvent by, for example, reduced distillation. Thus, a solid adsorbent is formed. The solvents usable in the formation of the present adsorbent are, for example, benzene, toluene, methylene chloride, and carbon disulfide.

As illustrated in examples hereinbelow, the adsorbents of the present invention can rapidly adsorb carbon monoxide contained in a gas mixture by contacting the gas mixture with the present adsorbents at a temperature of 0° C. to 90° C., desirably 10° C. to 30° C. under normal pressures (e.g., 1 atm). The carbon monoxide adsorption can also be carried out under an elevated pressure. In this case, the adsorption can be carried out at a temperature of higher than 90° C.

The adsorbed carbon monoxide is readily released or desorbed by heating the adsorbents at a temperature of 60° C. to 200° C., desirably 80° C. to 140° C. The desorption of the carbon monoxide can also be readily carried out by evacuating the system containing the adsorbent or decreasing a partial pressure of carbon monoxide in the system containing the adsorbent.

The carbon monoxide adsorbents containing polystyrene or its derivatives as component (c) according to the present invention are stable against water, when the adsorbents are prepared by using a nonaromatic solvent capable of dissolving or swelling the polystyrene or its derivatives. The carbon monoxide adsorbents containing activated carbon or graphite as component (c') according to the present invention are also stable against water, when the adsorbents are prepared by using either the above-mentioned aromatic solvents or the above-mentioned nonaromatic solvents (although the use of the aromatic solvents is desirable). For instance, no substantial decrease in the adsorbing capacity or power of the above adsorbents according to the present invention was observed after the adsorbents were contacted with a nitrogen stream containing a high content of water for 10 minutes as illustrated in the examples hereinbelow.

The gas mixture which can be utilized as a starting gas in the present invention desirably contains 1.0% through 99% by volume of carbon monoxide and less than a saturated vapor pressure (e.g. approximately 40,000 ppm by volume at 30° C.) of water.

The solid carbon monoxide adsorbents of the present invention can be packed in a packed column, a packed tower and a fluidized bed to adsorb and desorb carbon monoxide.

The present invention will now be further illustrated by, but is by no means limited to, the following examples.

EXAMPLE 1

The following chemicals and gases were used in this example.

Aluminum(III) chloride: Special grade chemical aluminum (III) chloride, manufactured by Kishida Kagaku Kogyo Kabushiki Kaisha (Japan), was purified by dewatering the same by means of a vacuum sublimation method.

Copper(I) chloride: Special grade chemical copper(I) chloride, manufactured by Komune Kagaku Yakuhin Kabushiki Kaisha (Japan), was purified by means of re-precipitation, ethanol and ether washing, and vacuum drying.

Polystyrene resin: Bio-Beads SM-2 (copolymer beads of 80 mol% styrene and 20 mol% divinylbenzene having a size of 20 to 50 mesh manufactured by Bio-Rad Laboratories Co., Ltd.) was purified by washing the beads while stirring with a magnetic stirrer, in a 7 N hydrochloric acid at 55° C. for 2 hours, in a 1 N sodium hydroxide at 55° C. for 2 hours, in water at 55° C. for 2 hours, in methanol at 25° C. for 1 hour, in a mixed solvent of methanol and methylene chloride (1:3) at 25° C. for 1 hour, in methylene chloride at 25° C. for 1 hour, and in toluene at 25° C. for 1 hour to remove impurities from the beads, and then vacuum dried at 100° C. for 12 hours.

Toluene: First grade chemical toluene, obtained from Takahashi Tokichi Shoten (Japan), was dehydrated with sodium metal, followed by distillation.

Carbon monoxide: A bomb gas (purity: 99.95%), manufactured by Takachiho Kagaku Kabushiki Kaisha (Japan), was dried and purified by passing the gas through a column packed with molecular sieve 3A (Nikka Seiko Kabushiki Kaisha, Japan) just before use.

Nitrogen: A bomb gas (purity: 99.999%), obtained from Kabushiki Kaisha Suzuki Shokan (Japan), was dried and purified by passing the gas through a column packed with molecular sieve 3A (Nikka Seiko Kabushiki Kaisha, Japan) just before use.

Into a 200 ml two-necked, eggplant-type flask, 5.2 g (39 mmol) of aluminum(III) chloride, 3.9 g (39 mmol) of copper(I) chloride, and 7.0 g (68 mmol in terms of the monomer residual group) of polystyrene resin, Bio-Beads SM-2, were charged under a dry nitrogen atmosphere. Twenty milliliters of toluene was added to the mixture. The mixture was heated at a temperature of 50° C. for 5 hours while being stirred with a magnetic stirrer. Thereafter, toluene was thoroughly removed by evacuating the flask to 4 mmHg while stirring with a magnetic stirrer at room temperature for 11 hours. Thus, a solid adsorbent in the form of yellow ochre to orange resin particles was prepared.

The adsorbent was charged into a 200 ml two-necked, eggplant-type flask and then the carbon monoxide gas was adsorbed into the adsorbent at 30° C. by connecting the flask to a vessel containing 1 liter of a gas mixture of carbon monoxide and nitrogen at 1 atm (partial pressure of CO and $N_2$ are 0.8 atm and 0.2 atm respectively), while the adsorbent was stirred with a magnetic stirrer. The gas mixture was circulated through the flask over the adsorbent by using an air pump, BA-106T manufactured by Kabushiki Kaisha Iwaki in the first 10 minutes of the adsorption. The amount of carbon monoxide adsorbed onto the adsorbent was determined at 30° C. according to the gas burette method.

The carbon monoxide was rapidly adsorbed onto the adsorbent. That is, 22.9 mmol of carbon monoxide was adsorbed after 3 minutes and 31.5 mmol of carbon monoxide, the approximate equilibrium adsorption amount, was adsorbed after 60 minutes.

The carbon monoxide adsorbed adsorbent was evacuated to 7 mmHg at a temperature of 30° C. for 10 minutes to release the adsorbed carbon monoxide from the adsorbent.

The two-necked flask was connected to a vessel containing 1 liter of a gas mixture of carbon monoxide and nitrogen at 1 atm (CO: 0.8 atm, $N_2$: 0.2 atm), and the gas mixture was circulated through the flask over the adsorbent by means of the air pump at 30° C., while the adsorbent was stirred with a magnetic stirrer. Thus, carbon monoxide was adsorbed.

The carbon monoxide was rapidly adsorbed onto the adsorbent. That is, 19.1 mmol of carbon monoxide was adsorbed after 3 minutes and 21.3 mmol of carbon monoxide, the approximate equilibrium adsorption amount, was adsorbed after 60 minutes. The carbon monoxide adsorbed was desorbed by evacuating the flask to 7 mmHg at 30° C. for 10 minutes with a vacuum pump.

Thereafter, carbon monoxide was again adsorbed onto the adsorbent contained in the two-necked flask by circulating 1 liter of a gas mixture of carbon monoxide and nitrogen at 1 atm (CO: 0.8 atm, $N_2$: 0.2 atm) through the flask. The carbon monoxide was rapidly adsorbed into the adsorbent. That is, 21.4 mmol of carbon monoxide, the approximate equilibrium adsorption amount, was adsorbed after 60 minutes.

EXAMPLE 2

An adsorbent was prepared in the same manner as described in example 1, except that 7.0 g of styrene copolymer beads (copolymer of 98 mol% styrene and 2 mol% divinylbenzene manufactured by Eastman Kodak Co., Ltd.) was used in lieu of 7.0 g of polystyrene resin, Rio-Beads SM-2. Thus, greenish brown carbon monoxide adsorbent resin beads were obtained.

The adsorbent was charged into a 200 ml two-necked, eggplant-type flask, and then, carbon monoxide gas was adsorbed onto the adsorbent at 30° C. by connecting the flask to a vessel containing 1 liter of a gas mixture of carbon monoxide and nitrogen gas at 1 atm (CO: 0.8 atm, $N_2$: 0.2 atm), while the gas mixture was circulated through the flask at 30° C. The carbon monoxide was rapidly adsorbed onto the adsorbent. That is, 21.8 mmol of carbon monoxide, the approximate equilibrium adsorption amount, was adsorbed after 30 minutes. Then, the carbon monoxide adsorbed was desorbed by evacuating the flask to 7 mmHg at 30° C. for 10 minutes with a vacuum pump.

The carbon monoxide was again adsorbed onto the adsorbent contained in the two-necked flask at 30° C. by circulating 1 liter of a gas mixture of carbon monoxide and nitrogen at 1 atm (CO: 0.8 atm, $N_2$: 0.2 atm) through the flask. The carbon monoxide was rapidly adsorbed onto the adsorbent. That is, 11.0 mmol of carbon monoxide, the approximate equilibrium adsorption amount, was adsorbed after 30 minutes. The carbon monoxide adsorbed was desorbed by evacuating the flask to 7 mmHg at 30° C. for 10 minutes with a vacuum pump.

Thereafter, the carbon monoxide was again adsorbed into the adsorbent contained in the two-necked flask at 30° C. by circulating 1 liter of a gas mixture of carbon monoxide and nitrogen at 1 atm (CO: 0.8 atm, $N_2$: 0.2 atm) through the flask. The carbon monoxide was rapidly adsorbed onto the adsorbent. That is, 11.0 mmol of carbon monoxide, the approximate equilibrium adsorption amount, was adsorbed after 30 minutes. The carbon monoxide adsorbed was desorbed by evacuating the flask to 7 mmHg at 30° C. for 10 minutes with a vacuum pump.

The carbon monoxide adsorption rate and amount were not changed even by repeating the above-mentioned operations.

EXAMPLE 3

Carbon monoxide was adsorbed onto an adsorbent prepared in the same manner as in Example 1 and contained in a 200 ml two-necked eggplant-type flask at 30° C. by circulating 1 liter of a gas mixture of carbon monoxide and nitrogen at 1 atm (CO: 0.8 atm, $N_2$: 0.2 atm) through the flask, while the adsorbent was stirred with a magnetic stirrer. The carbon monoxide was rapidly adsorbed onto the adsorbent. That is, 31.5 mmol of carbon monoxide, the approximate equilibrium adsorption amount, was adsorbed after 30 minutes.

The carbon monoxide adsorbed adsorbent was heated to a temperature of 90° C. under 1 atm, thereby causing the carbon monoxide to be rapidly released. The amount of carbon monoxide released was 27.8 mmol after 5 minutes. The released gas was carbon monoxide and no toluene was detected with a gas chromatography.

After cooling, carbon monoxide was again adsorbed onto the adsorbent contained in the flask at 30° C. by circulating 1 liter of a gas mixture of carbon monoxide and nitrogen (CO: 0.8 atm, $N_2$: 0.2 atm) through the flask, while the adsorbent was stirred with a magnetic stirrer. The carbon monoxide was rapidly adsorbed onto the adsorbent. That is, 27.7 mmol of carbon monoxide, the approximate equilibrium adsorption amount, was adsorbed after 30 minutes.

EXAMPLE 4

An adsorbent was prepared by using the same aluminum(III) chloride, copper(I) chloride, and polystyrene resin as used in Example 1 as follows.

Into a 200 ml two-necked, eggplant-type flask, 2.8 g (21 mmol) of aluminum(III) chloride, 2.1 g (21 mmol) of copper(I) chloride, and 2.6 g (25 mmol in terms of the monomer residual group) of polystyrene resin, Bio-Beads SM-2 were charged, and then, 10 ml of carbon disulfide (first grade chemical carbon disulfide, manufactured by Kanto Kagaku Kabushiki Kaisha, was dehydrated over phosphorus pentoxide, followed by distillation) was added to the mixture. The resultant mixture was heated under reflux, while the mixture was stirred with a magnetic stirrer. Then, the resultant mixture was evacuated to 4 mmHg to thoroughly remove the carbon disulfide, while the mixture was stirred at room temperature for 4 hours with a magnetic stirrer. Thus, an solid adsorbent in the form of yellow ochre to red brown resin beads was obtained.

The adsorbent was charged into a 100 ml two-necked, eggplant-type flask, and then, the carbon monoxide gas was adsorbed onto the adsorbent at 18° C., while the adsorbent was stirred with a magnetic stirrer by connecting the flask to a vessel containing carbon monoxide gas at 1 atm. The amount of carbon monoxide adsorbed onto the adsorbent was determined at 18° C. according to the gas burette method.

The carbon monoxide was rapidly adsorbed onto the adsorbent. That is, 16.0 mmol of carbon monoxide was adsorbed after 4 minutes, and then, 20.7 mmol of carbon monoxide, the approximate equilibrium adsorption amount, was adsorbed after 60 minutes. The adsorbed carbon monoxide was released or desorbed by evacuating the two-necked flask to 7 mmHg at 18° C. for 10 minutes with a vacuum pump.

The two-necked flask containing the above adsorbent was again connected to a vessel containing carbon monoxide gas at 1 atm and the carbon monoxide was adsorbed at 18° C. onto the adsorbent, while the adsorbent was stirred with a magnetic stirrer.

The carbon monoxide was rapidly adsorbed onto the adsorbent. That is, 9.8 mmol of carbon monoxide was adsorbed after 3 minutes and 11.2 mmol of carbon monoxide, the approximate equilibrium adsorption amount, was adsorbed after 60 minutes. The adsorbed carbon monoxide was desorbed by evacuating the flask to 7 mmHg at 18° C. for 10 minutes with a vacuum pump.

The two-necked flask was again connected to a vessel containing carbon monoxide gas at 1 atm and the carbon monoxide was adsorbed at 18° C. onto the adsorbent contained in the flask, while the adsorbent was stirred with a magnetic stirrer.

The carbon monoxide was rapidly adsorbed onto the adsorbent. That is, 9.8 mmol of carbon monoxide was adsorbed after 3 minutes and 11.2 mmol of carbon monoxide, the approximate equilibrium adsorbent amount, was adsorbed after 60 minutes.

Ten liters of a nitrogen gas containing 38.2 mg (2.1 mmol) of water (i.e. water content: 5070 ppm) and having a pressure of 1 atm was prepared. This nitrogen gas passed through the flask containing the adsorbent at a temperature of 18° C. for 10 minutes, while the adsorbent was stirred with a magnetic stirrer, by connecting the flask containing the adsorbent with a vessel containing the above nitrogen gas and by circulating the nitrogen gas through the flask with an air pump, BA-106T.

Then, the two-necked flask was evacuated at 18° C. to 7 mmHg for 10 minutes with a vacuum pump to desorb the adsorbed carbon monoxide.

Thereafter, the carbon monoxide was again adsorbed onto the adsorbent contained in the two-necked flask by connecting the flask to a vessel containing carbon monoxide gas at 1 atm. The carbon monoxide was rapidly adsorbed onto the adsorbent. That is, 10.8 mmol of carbon monoxide, the approximate equilibrium amount, was adsorbed after 60 minutes.

As is clear from these results, the absorption rate and amount of the carbon monoxide after contacting the adsorbent with the nitrogen gas containing 5070 ppm of water did not change, as compared with those before the contact.

The same carbon monoxide gas and nitrogen gas as used in Example 1 were used.

EXAMPLE 5

An adsorbent was prepared in a manner as in Example 4, except that methylene chloride (i.e., first grade chemical obtained from Takahashi Tokichi Shoten, Japan) was used in lieu of carbon disulfide. The methylene chloride was dehydrated with phosphorus, pentoxide, followed by distillation.

Into a 100 ml two-necked, eggplant-type flask, 2.5 g (19 mmol) of aluminum(III) chloride, 1.8 g (19 mmol) of copper (I) chloride and 2.3 g (22 mmol in terms of the monomer residual group) of polystyrene resin, Bio-Beads SM-2 were charged under a dry nitrogen atmosphere. Ten milliliters of methylene chloride was added to the mixture and the mixture was heated and refluxed while being stirred with a magnetic stirrer. Thereafter, methylene chloride was thoroughly removed by evacuating the flask to 4 mmHg, while being stirred by means of a magnetic stirrer at a room temperature for 4 hours. Thus, a solid adsorbent in the form of red-brown resin heads was prepared.

The absorbent thus obtained was charged into a 100 ml two-necked eggplant-type flask. The carbon monoxide was adsorbed onto the adsorbent at 18° C. by connecting the flask to a vessel containing carbon monoxide gas at 1 atm, while the adsorbent was stirred with a magnetic stirrer. The amount of carbon monoxide adsorbed was determined at 18° C. according to the gas burette method. The carbon monoxide was rapidly adsorbed onto the adsorbent. That is, 20.5 mmol of carbon monoxide, which was approximately the equilibrium adsorption amount, was adsorbed after 60 minutes. The adsorbed carbon monoxide was desorbed by evacuating the two-necked eggplant-type flask to 7 mmHg at 18° C. for 10 minutes with a vacuum pump.

The carbon monoxide was again adsorbed onto the adsorbent at 18° C. by connecting the flask to a vessel containing carbon monoxide gas at 1 atm, while the adsorbent was stirred with a magnetic stirrer. The carbon monoxide was rapidly adsorbed onto the adsorbent. That is, 6.5 mmol of carbon monoxide, which was approximately the equilibrium adsorption amount, was adsorbed after 60 minutes. The adsorbed carbon monoxide was desorbed by evacuating the two-necked eggplant-type flask to 7 mmHg at 18° C. for 10 minutes with a vacuum pump.

The carbon monoxide was again adsorbed onto the adsorbent at 18° C. by connecting the flask to a vessel containing carbon monoxide gas at 1 atm, while the adsorbent was stirred with a magnetic stirrer. The carbon monoxide was rapidly adsorbed onto the adsorbent. That is, 6.5 mmol of carbon monoxide, which was approximately the equilibrium adsorption amount, was adsorbed after 60 minutes.

Ten liters of a nitrogen gas containing 33.3 mg (1.9 mmol) of water (i.e., water content: 4420 ppm) and having a pressure of 1 atm was separately prepared.

A vessel containing the nitrogen gas prepared above was connected to the 100 ml two-necked eggplant-type flask containing the above adsorbent. The nitrogen gas was circulated through the flask with a BA-106T air pump (manufactured by Kabushiki Kaisha Twaki, Japan) at 18° C. for 10 minutes, so that the nitrogen gas passed through the overhead space of the adsorbent, while the adsorbent was stirred with a magnetic stirrer. The adsorbed monoxide was desorbed by evacuating the two-necked eggplant-type flask to 7 mmHg at 18° C. for 10 minutes with a vacuum pump.

Thereafter, the carbon monoxide was again adsorbed onto the adsorbent at 18° C. by connecting the flask to a vessel containing carbon monoxide gas at 1 atm, while the adsorbent was stirred with a magnetic stirrer. The carbon monoxide was rapidly adsorbed onto the adsorbent. That is, 6.8 mmol of carbon monoxide, which was approximately the equilibrium adsorption amount, was adsorbed after 60 minutes. No substantial decrease in the carbon monoxide absorption rate and amount of the adsorbent was observed as compared with the adsorbent prior to contact with the humid gas containing 4420 ppm of water.

EXAMPLE 6

A solid carbon monoxide adsorbent was prepared in the same manner as in Example 5.

The adsorbent thus obtained was charged into a 100 ml two-necked eggplant-type flask. The carbon monoxide was adsorbed onto the adsorbent at 18° C. by connecting the flask to a vessel containing carbon monoxide gas at 1 atm, while the adsorbent was stirred by means of a magnetic stirrer. The amount of carbon monoxide adsorbed was determined at 18° C. according to the gas burette method. The carbon monoxide was rapidly adsorbed onto the adsorbent. That is, 20.5 mmol of carbon monoxide, which was approximately the equilibrium adsorption amount, was adsorbed after 60 minutes.

When the adsorbent was heated to a temperature of 145° C. under 1 atm, the carbon monoxide was rapidly released from the adsorbent. The amount of carbon monoxide released was 18.7 mmol after 5 minutes. The gas chromatograph analysis of the released gas indicated that the released gas was carbon monoxide and no other component was found.

The carbon monoxide was again adsorbed onto the adsorbent at 18° C. by connecting the flask to a vessel containing carbon monoxide gas at 1 atm, while the adsorbent was stirred by means of a magnetic stirrer. The carbon monoxide was rapidly adsorbed onto the adsorbent. That is, 18.7 mmol of carbon monoxide, which was approximately the equilibrium adsorption amount, was adsorbed after 60 minutes.

When the adsorbent was heated to a temperature of 145° C. under 1 atm, the carbon monoxide was rapidly released from the adsorbent. The amount of carbon monoxide released was 18.7 mmol after 5 minutes.

The carbon monoxide was again adsorbed onto the adsorbent at 18° C. by connecting the flask to a vessel containing carbon monoxide gas at 1 atm, while the adsorbent was stirred by means of a magnetic stirrer. The carbon monoxide was rapidly adsorbed onto the adsorbent. That is, 18.7 mmol of carbon monoxide, which was approximately the equilibrium adsorption amount, was adsorbed after 60 minutes. When the adsorbent was heated to a temperature of 145° C. under 1 atm, the carbon monoxide was rapidly released from the adsorbent. The amount of carbon monoxide released was 18.7 mmol after 5 minutes.

Ten liters of a nitrogen gas containing 33.3 mg (1.9 mmol) of water (i.e., water content: 4420 ppm) and having a pressure of 1 atm was separately prepared.

A vessel containing the nitrogen gas prepared above was connected to the 100 ml two-necked eggplant-type flask containing the above adsorbent. The nitrogen gas was circulated through the flask with a BA-106T air pump (manufactured by Kabushiki Kaisha Iwaki, Japan) at 18° C. for 10 minutes, while the adsorbent was stirred with a magnetic stirrer.

The carbon monoxide was again adsorbed onto the adsorbent at 18° C. by connecting the flask to a vessel containing carbon monoxide gas at 1 atm, while the adsorbent was stirred with a magnetic stirrer. The carbon monoxide was rapidly adsorbed onto the adsorbent. That is, 19.0 mmol of carbon monoxide, which was approximately the equilibrium adsorption amount, was adsorbed after 60 minutes. No substantial decrease in the carbon monoxide absorption rate and amount of the adsorbent was observed as compared with the adsorbent prior to contact with the humid gas containing 4420 ppm of water.

EXAMPLE 7

An adsorbent was prepared by using the same aluminum(III) chloride, copper(I) chloride, and toluene as used in Example 1 as follows. Activated carbon, BAC, MU.LL, Lot No.51201 (manufactured by Taiyo Kaken Kabushiki Kaisha having an average particle size of 750 microns and a surface area of 1100 to 1200 m2/g)) was used, as a component (c'), after heating at 180° C. for 4 hours and was stored under a dry nitrogen atmosphere.

Under a dry nitrogen atmosphere, 3.0 g (22.5 mmol) of aluminum(III) chloride, and 2.3 g (22.5 mmol) of copper(I) chloride were charged into a 100 ml two-necked eggplant-type flask, and 20 ml of toluene was added thereto. The resultant mixture was heated at 60° C. for 4 hours, while the mixture was stirred with a magnetic stirrer. Ten grams of the activated carbon was charged into another 100 ml two-necked eggplant-type flask and the flask was evacuated in vacuo with a vacuum pump. Then, the toluene solution of the aluminum-(III) chloride and the copper(I) chloride prepared above was dropwise added to the flask with a dropping funnel. After containing agitation for one hour, the flask was evacuated to 6 mmHg to thoroughly remove toluene. Thus, a carbon monoxide adsorbent in the form of black particles was obtained.

The adsorbent was charged into a 100 ml two-necked, eggplant-type flask and then, the carbon monoxide gas was adsorbed onto the adsorbent at 20° C. by connecting the flask to a vessel containing a gas mixture of carbon monoxide and nitrogen at 1 atm (partial pressure: CO 0.9 atm, $N_2$ 0.1 atm). The gas mixture was circulated through the flask with a BA-106T air pump (manufactured by Kabushiki Kaisha Iwaki, Japan) during the initial 10 min. absorption period, while the adsorbent was stirred with a magnetic stirrer. The amount of carbon monoxide adsorbed into the adsorbent was determined at 20° C. according to the gas burette method.

The carbon monoxide was rapidly adsorbed onto the adsorbent. That is, 14.0 mmol of carbon monoxide was adsorbed after 3 minutes and 18.0 mmol of carbon monoxide, the approximate equilibrium absorption amount, was adsorbed after 60 minutes. The carbon monoxide adsorbed was desorbed at 20° C. by evacuating the flask to 6 mmHg for 10 minutes.

The carbon monoxide was again adsorbed onto the adsorbent contained in the flask by connecting the flask to a vessel containing 1.5 liters of a gas mixture of carbon monoxide and nitrogen at 1 atm (partial pressure: CO 0.9 atm, $N_2$ 0.1 atm). The gas mixture was circulated through the flask at 20° C. with an air pump, while the adsorbent was stirred with a magnetic stirrer.

The carbon monoxide was rapidly adsorbed onto the adsorbent. That is, 9.0 mmol of carbon monoxide was absorbed after 3 minutes, and then, 11.7 mmol of carbon monoxide, the approximate equilibrium absorption amount, was absorbed alter 60 minutes. Then the adsorbed carbon monoxide was desorbed by evacuating the flask to 6 mmHg at 20° C. for 10 minutes with a vacuum pump.

Thereafter, the carbon monoxide was adsorbed onto the adsorbent by circulating 1.5 liters of the gas mixture of carbon monoxide and nitrogen at 1 atm (partial pressure: CO 0.9 atm, $N_2$ 0.1 atm) through the flask in the same manner as used above.

The carbon monoxide was rapidly adsorbed onto the adsorbent. That is, 11.9 mmol of carbon monoxide, the approximate equilibrium adsorption amount, was adsorbed after 60 minutes.

No substantial change of the adsorption rate and adsorption amount of carbon monoxide was observed by the further repeated operations.

Five liters of a nitrogen gas containing 40 mg (2.2 mmol) of water (i.e. water content: 11000 ppm) and having a pressure of 1 atm was prepared.

A vessel containing the nitrogen gas prepared above was connected to a 100 ml two-necked eggplant-type flask containing the above-prepared adsorbent. The nitrogen gas was circulated through the flask with a BA-106T air pump (manufactured by Kabushiki Kaisha Iwaki, Japan) at a temperature of 20° C. for 10 minutes, while the adsorbent was stirred with a magnetic stirrer.

Thereafter, the flask containing the adsorbent mentioned above was connected to the vessel containing 1.5 liters of the above-mentioned gas mixture having a pressure of 1 atm (partial pressure: CO 0.9 atm, $N_2$ 0.1 atm). The gas mixture was circulated through the flask with the air pump, while the adsorbent was stirred at 20° C. with a magnetic stirrer. The carbon monoxide was rapidly absorbed onto the adsorbent. That is, 11.8 mmol of carbon monoxide was adsorbed onto the adsorbent. Thus, no substantial decrease in the carbon monoxide adsorption rate and amount of the adsorbent was observed as compared with the adsorbent prior to contact with the humid $N_2$ gas containing 11,000 ppm of water.

EXAMPLE 8

A carbon monoxide adsorbent was prepared from 2.1 g (15.8 mmol) of aluminum(III) chloride, 1.6 g (15.8 mmol) of copper chloride and 10 g of activated carbon in the same manner as used in Example 7.

The adsorbent was charged into a 100 ml two-necked, eggplant-type flask and, then, the carbon monoxide gas was adsorbed onto the adsorbent at 20° C. by connecting the flask to a vessel containing 1.5 liters of a gas mixture of carbon monoxide and nitrogen at 1 atm (partial pressure: CO 0.9 atm, $N_2$ 0.1 atm). The gas mixture was circulated through the flask with a BA-106T air pump (manufactured by Kabushiki Kaisha Iwaki, Japan) during the initial 10 min. adsorption period, while the adsorbent was stirred with a magnetic stirrer. The amount of carbon monoxide adsorbed onto the adsorbent was determined at 20° C. according to the gas burette method. The carbon monoxide was rapidly adsorbed onto the adsorbent. That is, 7.9 mmol of carbon monoxide was adsorbed after 3 minutes and 13.7 mmol of carbon monoxide, which was approximately the equilibrium adsorption amount, was absorbed after 60 minutes.

The carbon monoxide adsorbed adsorbent in the flask was heated to a temperature of 130° C. under 1 atm and the amount of the gas released was determined with the gas burette method. The carbon monoxide was rapidly released from the adsorbent. The amount of carbon monoxide released was 10.1 mmol after 30 minutes. The gas chromatograph analysis of the released gas indicated that the released gas was carbon monoxide and no other component was found.

The carbon monoxide was again adsorbed onto the adsorbent at 20° C. by connecting the flask to a vessel containing 1.5 liters of a gas mixture of carbon monoxide and nitrogen at 1 atm (partial pressure: CO 0.9 atm, $N_2$ 0.1 atm). The gas mixture was circulated through the flask by the air pump, while the adsorbent was stirred with a magnetic stirrer.

The carbon monoxide was rapidly absorbed onto the adsorbent. That is, 5.5 mmol of carbon monoxide was adsorbed after 3 minutes and 9.4 mmol of carbon monoxide, which was approximately the equilibrium adsorption amount, was absorbed after 60 minutes.

The carbon monoxide adsorbed adsorbent in the flask was heated to a temperature of 130° C. under 1 atm and the amount of the gas released was 9.4 mmol after 30 minutes.

The carbon monoxide was again adsorbed onto the adsorbent at 20° C. by connecting the flask to a vessel containing 1.5 liters of a gas mixture of carbon monoxide and nitrogen at 1 atm (partial pressure: CO 0.9 atm, $N_2$ 0.1 atm). The gas mixture was circulated through the flask by the air pump, while the adsorbent was stirred with a magnetic stirrer.

The carbon monoxide was rapidly adsorbed onto the adsorbent. That is 9.6 mmol of carbon monoxide, which was approximately the equilibrium adsorption amount, was absorbed after 60 minutes.

The carbon monoxide adsorbed adsorbent in the flask was heated to a temperature of 130° C. under 1 atm and the amount of the gas released was 9.6 mmol after 30 minutes.

Five liters of a nitrogen gas containing 29 mg (1.6 mmol) of water (i.e., water content: 8000 ppm) and having a pressure of 1 atm was separately prepared.

A vessel containing the nitrogen gas prepared above was connected to the 100 ml two-necked eggplant-type flask containing the above adsorbent. The nitrogen gas was circulated through the flask with a BA-106T air pump (manufactured by Kabushiki Kaisha Iwaki, Japan) at 20° C. for 10 minutes, so that the nitrogen gas passed through the overhead space of the adsorbent, while the adsorbent was stirred with a magnetic stirrer.

Thereafter, the carbon monoxide gas was adsorbed onto the adsorbent at 20° C. by connecting the flask to a vessel containing 1.5 liters of a gas mixture of carbon monoxide and nitrogen at 1 atm (partial pressure: CO 0.9 atm, $N_2$ 0.1 atm). The gas mixture was circulated through the flask with the air pump, while the adsorbent was stirred with a magnetic stirrer.

The carbon monoxide was rapidly adsorbed onto the adsorbent. That is, 9.3 mmol of carbon monoxide, which was approximately the equilibrium adsorption amount, was absorbed after 60 minutes. No substantial decrease in the carbon monoxide absorption rate and amount of the adsorbent was observed as compared with the adsorbent prior to contact with the humid gas containing 8000 ppm of water.

EXAMPLE 9

An adsorbent was prepared by using the same chemical reagents as used in Example 7, except that graphite (first grade reagent, Lot No. MIC2352, obtained from Nakarai Kagaku Yakuhin Kabushiki-Kaisha, Japan) was used in lieu of the activated carbon used in Example 7.

Into a 100 ml two-necked, eggplant-type flask, 3.1 g (23.3 mmol) of aluminum(III) chloride, 2.4 g (23.3 mmol) of copper(I) chloride and 20 ml of toluene were charged under a dry nitrogen atmosphere and, then, 20 ml of toluene was added thereto. The resultant mixture was stirred at a temperature of 60° C. for 4 hours, while the mixture was stirred with a magnetic stirrer. Ten grams of the graphite was charged into another 100 ml two-necked eggplant-type flask and, then, the toluene solution of aluminum(III) chloride and copper(I) chloride prepared above was added thereto while stirring. The stirring was continued for 1 hour and, then, the flask was evacuated to 6 mmHg to thoroughly remove toluene. Thus, a carbon monoxide adsorbent in the form of black powder was obtained.

The adsorbent thus obtained was charged into a 100 ml two-necked eggplant-type flask and, then, the carbon monoxide gas was adsorbed onto the adsorbent at 20° C. by connecting the flask to a vessel containing 1.5 liters of a carbon monoxide gas at 1 atm. The carbon monoxide gas was circulated through the flask with an air pump, while the adsorbent was stirred with a magnetic stirrer. The amount of carbon monoxide adsorbed onto the adsorbent was determined at 20° C. according to the gas burette method. The carbon monoxide was rapidly adsorbed onto the adsorbent. That is, 26.7 mmol of carbon monoxide was adsorbed after 3 minutes and 29.5 mmol of carbon monoxide, which was approximately the equilibrium adsorption amount, was absorbed after 60 minutes.

The adsorbed carbon monoxide was desorbed by evacuating the two-necked eggplant-type flask to 6 mmHg at 20° C. for 10 minutes with a vacuum pump.

Thereafter, the carbon monoxide was again adsorbed onto the adsorbent at 20° C. by connecting the flask to a vessel containing 1.5 liters of carbon monoxide gas at 1 atm, while the adsorbent was stirred with a magnetic stirrer.

The carbon monoxide was rapidly adsorbed onto the adsorbent. That is, 15.4 mmol of carbon monoxide was adsorbed after 3 minutes and 16.4 mmol of carbon monoxide, which was approximately the equilibrium adsorption amount, was adsorbed after 60 minutes. The adsorbed carbon monoxide was desorbed by evacuating the two-necked eggplant-type flask to 6 mmHg at 20° C. for 10 minutes with a vacuum pump.

The carbon monoxide was again adsorbed onto the adsorbent at 20° C. by connecting the flask to a vessel containing 1.5 liters of carbon monoxide gas at 1 atm, while the adsorbent was stirred with a magnetic stirrer.

The carbon monoxide was rapidly adsorbed onto the adsorbent. That is, 16.5 mmol of carbon monoxide, which was approximately the equilibrium adsorption amount, was adsorbed after 60 minutes.

No substantial decrease in the carbon monoxide absorption rate and amount of the adsorbent was observed by further repeated adsorption-desorption operations.

We claim:

1. A process for separating carbon monoxide from a gas mixture containing the same, comprising the steps of:
   (1) contacting the gas mixture containing carbon monoxide with a solid adsorbent comprising (a) at least one copper (I) halide and (b) at least one aluminum (III) halide supported on (c) activated carbon or graphite in which the molar ratio of the copper (I) halide to the aluminum (III) halide is 0.3 to 10 and the weight ratio of the activate carbon or graphite to the copper (I) halide is 0.25 to 25, said contacting conducted at a temperature of from 0° C. to 90° C., and (2) desorbing the adsorbed carbon monoxide from the solid adsorbent and recovering the carbon monoxide.

2. A process as claimed in claim 1, wherein the gas mixture contains 1.0% through 99% by volume of carbon monoxide.

3. A process as claimed in claim 1, wherein the gas mixture contains less than a saturated vapor pressure of water.

4. A process as claimed in claim 1, wherein the copper (I) halide is copper (I) chloride or copper (I) bromide.

5. A process as claimed in claim 1, wherein the aluminum III halide is selected from the group consisting of aluminum (III) chloride, aluminum (III) fluoride, and aluminum (III) bromide.

6. A process as claimed in claim 1, wherein said adsorbent is obtained by dissolving copper (I) halide and aluminum (III) halide in an organic solvent and by depositing the resultant solution on the activated carbon or graphite, followed by the removal of the solvent.

* * * * *